US012735765B2

(12) United States Patent
Long et al.

(10) Patent No.: US 12,735,765 B2
(45) Date of Patent: Sep. 15, 2026

(54) COPPER-TIN-NICKEL BRAZING MATERIAL PREPARED BY ALLOYS RECYCLED FROM E-WASTE, PREPARATION METHOD THEREFOR AND SYSTEM THEREOF

(71) Applicant: ZHENGZHOU RESEARCH INSTITUTE OF MECHANICAL ENGINEERING CO., LTD., Henan (CN)

(72) Inventors: Weimin Long, Henan (CN); Tianran Ding, Henan (CN); Sujuan Zhong, Henan (CN); Li Bao, Henan (CN); Junlan Huang, Henan (CN); Jiao Yang, Henan (CN); Yuanyuan Dong, Henan (CN); Hangyan Xue, Henan (CN); Yanhong Guo, Henan (CN)

(73) Assignee: ZHENGZHOU RESEARCH INSTITUTE OF MECHANICAL ENGINEERING CO., LTD., Zhengzhou (CN)

( * ) Notice: Subject to any disclaimer, the term of this patent is extended or adjusted under 35 U.S.C. 154(b) by 448 days.

(21) Appl. No.: 18/457,385

(22) Filed: Aug. 29, 2023

(65) Prior Publication Data

US 2024/0068069 A1 Feb. 29, 2024

(51) Int. Cl.
*C22B 7/04* (2006.01)
*B23K 35/02* (2006.01)
(Continued)

(52) U.S. Cl.
CPC ............ *C22B 7/04* (2013.01); *B23K 35/0244* (2013.01); *B23K 35/302* (2013.01); *C22B 1/005* (2013.01);
(Continued)

(58) Field of Classification Search
None
See application file for complete search history.

(56) References Cited

U.S. PATENT DOCUMENTS

2018/0142329 A1 5/2018 Stoffner

FOREIGN PATENT DOCUMENTS

CN 101504249 A 8/2009
CN 102471828 A 5/2012
(Continued)

OTHER PUBLICATIONS

CN Notification to Grant Patent Right for Invention of priority document CN202211040125.8 dated May 9, 2023, 4 pages.
(Continued)

*Primary Examiner* — Anthony M Liang
(74) *Attorney, Agent, or Firm* — Tarolli, Sundheim, Covell & Tummino LLP

(57) ABSTRACT

Copper-tin-nickel brazing material prepared by alloys recycled from E-waste, preparation method therefor, and system thereof are provided. A preparation method for the copper-tin-nickel brazing material includes the following steps: (a) spreading nano-$SiO_2$ on the bottom of crucible and then adding a crude copper-tin-iron-nickel alloy recycled from E-waste; (b) heating the crucible to melt the crude alloy into a metal liquid so that Zn and Pb in the metal liquid react with the $SiO_2$ to form a slag that floats out; (c) introducing a refining gas to the bottom of metal liquid in step (b), thereby removing the scums or gases formed by Pb, Fe, S, and O in the metal liquid; (d) performing heat-preserving directional solidification on the metal liquid, to bias-aggregate the Fe and Sb at one end and remove the same to obtain a copper-based intermediate alloy; and smelting and powdering the copper-based intermediate alloy.

14 Claims, 4 Drawing Sheets

(51) Int. Cl.

| | |
|---|---|
| ***B23K 35/30*** | (2006.01) |
| ***C22B 1/00*** | (2006.01) |
| ***C22B 9/05*** | (2006.01) |
| ***C22B 9/16*** | (2006.01) |
| ***C22B 15/00*** | (2006.01) |
| ***C22C 3/00*** | (2006.01) |
| ***C22C 9/02*** | (2006.01) |
| *B23K 103/12* | (2006.01) |

(52) U.S. Cl.

CPC .................. *C22B 9/05* (2013.01); *C22B 9/16* (2013.01); *C22B 15/0002* (2013.01); *C22B 15/0028* (2013.01); *C22B 15/0056* (2013.01); *C22C 3/00* (2013.01); *C22C 9/02* (2013.01); *B23K 2103/12* (2018.08)

(56) References Cited

FOREIGN PATENT DOCUMENTS

| | | | | | |
|---|---|---|---|---|---|
| CN | 109609766 | A | | 4/2019 | |
| CN | 111041213 | A | * | 4/2020 | ............. C22B 7/001 |
| GB | 1172098 | | | 11/1969 | |

OTHER PUBLICATIONS

CN Notification to Grant Patent Right for Invention of priority document CN202211040125.8-EN dated May 9, 2023, 4 pages.

* cited by examiner

| Element Number | Element Symbol | Element Name | Atomic Conc. | Weight Conc. |
|---|---|---|---|---|
| 29 | Cu | Copper | 81.17 | 88.07 |
| 50 | Sn | Tin | 6.32 | 9.81 |
| 8 | Ni | Nickel | 12.29 | 1.97 |
| 26 | Impurity | Impurities | 0.22 | 0.15 |

COPPER-TIN-NICKEL BRAZING MATERIAL PREPARED BY ALLOYS RECYCLED FROM E-WASTE, PREPARATION METHOD THEREFOR AND SYSTEM THEREOF

CROSS-REFERENCE TO RELATED APPLICATION

The present disclosure claims the priority to the Chinese patent application with the filing No. 2022110401258 filed with the Chinese Patent Office on Aug. 29, 2022, and entitled "Copper-Tin-Nickel Brazing Material Prepared by Alloys Recycled from E-waste, Preparation Method Therefor and System Thereof", the contents of which are incorporated herein by reference in entirety.

TECHNICAL FIELD

The present disclosure relates to the technical field of brazing materials, and specifically, to a copper-tin-nickel brazing material prepared by alloys recycled from E-waste, preparation method therefor, and system thereof.

BACKGROUND ART

E-waste, commonly known as "electronic waste", refers to electrical or electronic equipment that is discarded and no longer in use, mainly including obsolete products such as refrigerators, air-conditioners, washing machines, televisions, and other household appliances, and computers, and other communication electronic products.

Existing recycling of E-waste is mainly through calcination to remove organic materials, and then through the acid and alkali solution to recover and obtain crude alloy. For example, the recycled crude alloys from waste circuit boards not only have a large number of Cu, but also contain 3.6%-5% of Fe, 5%-6% of Sn, 1.5%-2.5% of Ni, as well as about 1% of Ag, Au, Pb, Sb, Zn, etc. The alloy elements are of a large variety and relatively complex, and the impurity content is high, which restricts the efficient and accurate use for the recycled alloy, thereby refraining the popularity and use range of recycling E-waste.

In order to solve the above deficiencies, to develop a method of preparing copper-tin-nickel brazing powder by using copper-tin-iron-nickel alloy recycled from E-waste is needed, which can overcome the shortcomings of low utilization value of recycled alloy, and also reduce the cost of brazing material and save resources.

In view of this, the present disclosure is proposed specifically.

SUMMARY

One object of the present disclosure is to provide a preparation method for copper-tin-nickel brazing material. A three-step purification method is adopted, which can effectively remove impurities of copper-tin-iron-nickel alloy recycled from E-waste, so as to prepare and obtain copper-tin-nickel brazing powder.

Another object of the present disclosure is to provide a copper-tin-nickel brazing material prepared by the preparation method for copper-tin-nickel brazing material.

Another object of the present disclosure is to provide use of the copper-tin-nickel brazing material in vacuum brazing of cemented carbide and steel.

Another object of the present disclosure is to provide a system used to implement the preparation method for copper-tin-nickel brazing material.

In order to realize the above objects of the present disclosure, the following technical solutions are adopted.

A preparation method for the copper-tin-nickel brazing material includes the following steps:

(a) spreading nano-SiO2 on the bottom of a crucible and then adding a crude copper-tin-iron-nickel alloy recycled from E-waste;

(b) heating the crucible to melt the crude copper-tin-iron-nickel alloy into a metal liquid, so that a first impurity in the metal liquid reacts with the SiO2 at the bottom to form a slag that floats out and is removed, wherein the first impurity includes Zn and Pb;

(c) introducing a refining gas to the bottom of the metal liquid in step (b) and stirring the resultant, such that a second impurity in the metal liquid forms the scums or gases and then is removed, wherein the second impurity includes Pb, Fe, S, and O;

(d) performing heat-preserving directional solidification on the metal liquid in step (c), so as to bias-aggregate a third impurity at one end and remove the same to obtain a copper-based intermediate alloy, wherein the third impurity includes Fe and Sb; and (e) smelting and powdering the copper-based intermediate alloy in step (d).

Preferably, the nano-SiO2 has a particle size of 15-30 nm.

Preferably, the heating temperature adopted for heating the crucible is 1200-1300° C.

Preferably, the refining gas is a mixed gas of argon and trimethyl borate.

Preferably, the volume ratio of argon to trimethyl borate is 1:(2-3).

Preferably, the heat-preserving directional solidification specifically includes the following steps:

injecting the metal liquid in step (c) into the interior of a vertically placed casting mold, heating the casting mold with a heater, and placing the lower portion of the casting mold on a water-cooled plate; and when all the metal in the casting mold is in the liquid status, passing the cooling circulating water through the water-cooled plate, and at the same time, moving out the casting mold from below.

Preferably, the heating temperature adopted to heat the casting mold is 1000-1100° C.

Preferably, the casting mold is removed from below at a speed of 3-8 mm/s.

Preferably, the smelting and the powdering specifically include: melting the copper-based intermediate alloy into an alloy liquid, sprinkling a covering agent on the surface of the alloy liquid, and then making the resultant undergo standing, slagging-off, and atomization.

Preferably, the covering agent includes borax and calcium fluoride.

Preferably, the mass ratio of the borax and the calcium fluoride is 8:(1-3).

Preferably, the standing time is 10-20 min.

Preferably, the crude copper-tin-iron-nickel alloy recycled from E-waste includes components in following mass percentages:

74.5%-85.5% of Cu, 4.5%-13.6% of Sn, 0.9%-2.7% of Ni, and the remaining impurity elements.

The impurity elements include Fe, Zn, Pb, S, and O.

Preferably, the mass percentage of the impurity is 9.1%-9.2%.

A copper-tin-nickel brazing material is prepared by the preparation method for the copper-tin-nickel brazing material.

Use of the copper-tin-nickel brazing material in vacuum brazing of cemented carbide and steel.

A system implementing the preparation method for the copper-tin-nickel brazing material includes a first purification unit and a second purification unit, wherein the first purification unit comprises a crucible, sensors, and a ventilating pipe, wherein the sensors are provided on the outside of the crucible, and one end of the ventilating pipe is provided close to the inner bottom of the crucible; and the second purification unit comprises a casting mold, a furnace body, a heater, and a water-cooled plate, wherein the casting mold is positioned inside the furnace body, the heater is positioned outside the furnace body and the water-cooled plate is positioned at the bottom of the casting mold.

The beneficial effects of the present disclosure compared to the prior art are as follows.

(1) The present disclosure utilizes a three-step purification method, which can effectively remove the impurities of the copper-tin-iron-nickel alloy recycled from E-waste to obtain a copper-based intermediate alloy with less impurity, thereby satisfying the requirements of impurity content 0.15%. By using the obtained copper-based intermediate alloy, the copper-tin-nickel brazing powder is obtained through smelting, such that the high-added-value utilization of alloy recycled from E-waste is realized.

(2) When the copper-tin-nickel brazing powder of the present disclosure is used for vacuum brazing of cemented carbide and steel, the strength of welded joint is better than that of the corresponding new brazing powder.

(3) Adopting the system employed to implement the preparation method for the copper-tin-nickel brazing material of the present disclosure can obtain a high-performance copper-tin-nickel brazing powder.

BRIEF DESCRIPTION OF DRAWINGS

In order to more clearly illustrate the technical solutions in the specific embodiments of the present disclosure or prior art, the drawings to be used in the description of the specific embodiments or prior art will be briefly introduced below. It will be obvious that the drawings in the following description are some of the embodiments of the present disclosure, and for a person of ordinary skill in the art, other drawings can be obtained based on these drawings without inventive effort.

REFERENCE NUMERALS

Figure 1:
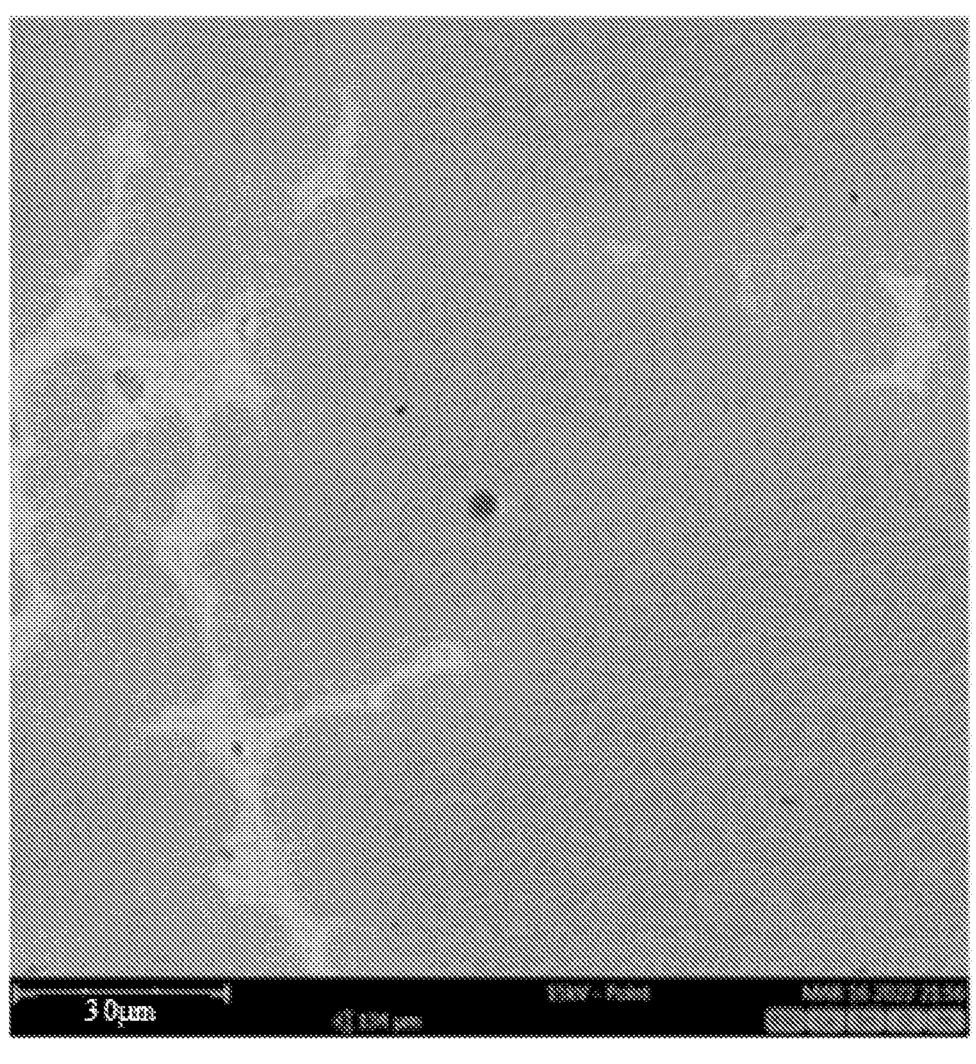
FIG. 1 is an SEM image of the brazing powder remelting alloy of Example 1 of the present disclosure.

1—crucible, 2—metal liquid, 3—sensor, 4—ceramic pipe, 5—nano-SiO2 powder, 6—heater, 7—metal liquid in the upper portion of the casting mold, 8—solid metal in the lower portion of the casting mold, 9—furnace body, 10—water—cooled plate, and 11—casting mold.

DETAILED DESCRIPTION OF EMBODIMENTS

Embodiments of the present disclosure will be described in detail below in connection with the embodiments, but it will be understood by those of skill in the art that the following embodiments are intended to illustrate the present disclosure only and should not be considered as limiting the scope of the present disclosure. Those specific conditions that are not indicated in the embodiments, conventional conditions, or conditions recommended by the manufacturer are followed. The reagents or instruments used without indication of the manufacturer are conventional products that are commercially available.

A preparation method for the copper-tin-nickel brazing material includes the following steps:

(a) spreading nano-SiO2 on the bottom of a crucible and then adding a crude copper-tin-iron-nickel alloy recycled from E-waste;

(b) heating the crucible to melt the crude copper-tin-iron-nickel alloy into a metal liquid, so that a first impurity in the metal liquid reacts with the SiO2 at the bottom to form a slag that floats out and is removed, wherein the first impurity includes Zn and Pb;

(c) introducing a refining gas to the bottom of the metal liquid in step (b) and stirring the resultant, such that a second impurity in the metal liquid forms the scums or gases and then is removed, wherein the second impurity includes Pb, Fe, S, and O;

(d) performing heat-preserving directional solidification on the metal liquid in step (c), so as to bias-aggregate a third impurity at one end and remove the same to obtain a copper-based intermediate alloy, wherein the third impurity includes Fe and Sb; and (e) smelting and powdering the copper-based intermediate alloy in step (d).

Through measurement and calculation, the composition of crude alloy recycled from E-waste is close to that of certain copper-tin-nickel brazing materials. If the recycled crude alloy can be further purified, the brazing powder can be obtained by smelting and atomization with the purified alloy as the substrate, which will help to realize the high-added-value utilization of the alloy recycled from E-waste and save the cost of brazing materials.

The first step of purification in the present disclosure is: the nano-SiO2 powder placed in the bottom of the crucible reacts with the PbO and ZnO (Pb and Zn are oxidized at high temperature to form PbO and ZnO, wherein the density of PbO is 9.2 g/cm3, which is heavier and easy to sink to the bottom of the crucible) in the solution to form (xPbO·ySiO2) and ZnSiO3 scums with low density, which floats to the surface to be removed; the second step of purification is: the mixed gas of argon and trimethyl borate is used to react with metal oxides in solution, for example, B2O3 formed by pyrolysis of trimethyl borate reacts with PbO and FexOy to form borates to be removed, and S reacts with O2 in solution to form SO2 gas to be removed; and the third step of purification is: by utilizing heat-preserving directional solidification, Fe impurities in solution bias-aggregate to one end and are mechanically removed.

In one embodiment, the nano-SiO2 has a particle size of 15-30 nm, for example, 18 nm, 20 nm, 22 nm, 25 nm, 28 nm, or 30 nm and so on.

In one embodiment, the heating temperature employed for heating the crucible is 1200-1300° C., for example, 1210° C., 1220° C., 1230° C., 1250° C., 1270° C., or 1280° C. and so on.

In one embodiment, the refining gas is a mixed gas of argon and trimethyl borate.

In one embodiment, the volume ratio of the argon to the trimethyl borate is 1:(2-3), for example, 1:2, 1:2.5, or 1:3 and so on.

In one embodiment, the heat-preserving directional solidification specifically includes the following steps:

injecting the metal liquid in step (c) into the interior of a vertically placed casting mold, heating the casting mold with a heater, and placing the lower portion of the casting mold on a water-cooled plate; and when all the metal in the casting mold is in the liquid status, passing the cooling circulating water through the water-cooled plate, and at the same time, moving out the casting mold from below, such that the metal liquid inside the casting mold is solidified sequentially in a single direction from bottom to top.

In one embodiment, the heating temperature for heating the casting mold is 1000-1100° C., such as 1010° C., 1020° C., 1050° C., 1070° C., 1080° C., or 1090° C., etc.

In one embodiment, the casting mold is removed from below at a speed of 3-8 mm/s. In one embodiment, the casting mold is removed from below at a speed that includes but is not limited to 3.5 mm/s, 4 mm/s, 5 mm/s, 6 mm/s, 7 mm/s, or 8 mm/s.

In one embodiment, the smelting and the powdering specifically include: melting the copper-based intermediate alloy into an alloy liquid, sprinkling a covering agent on the surface of the alloy liquid, and then making the resultant undergo standing, slagging-off, and atomization.

In one embodiment, the covering agent comprises borax and calcium fluoride.

In one embodiment, the mass ratio of the borax to the calcium fluoride is 8:(1-3). In one embodiment, the mass ratio of the borax to the calcium fluoride includes but is not limited to 8:1, 8:1.5, 8:2, 8:2.5, or 8:3, and the like.

In one embodiment, the standing time is 10-20 min, for example, 11 min, 12 min, 13 min, 15 min, 16 min, 17 min, 18 min, or 19 min, etc.

In one embodiment, the crude copper-tin-iron-nickel alloy recycled from E-waste includes components in following mass percentages:

74.5%-85.5% of Cu, 4.5%-13.6% of Sn, 0.9%-2.7% of Ni, and the remaining impurity elements; and the impurity elements include Fe, Zn, Pb, S, and O.

In one embodiment, the mass percentage of the impurities is 9.1%-9.2%.

In another aspect, the present disclose also provides a system used for the preparation method for the copper-tin-nickel brazing material, including a first purification unit and a second purification unit, wherein the first purification unit comprises a crucible, a sensor, and a ventilating pipe, wherein the sensor is provided on the outside of the crucible, and one end of the ventilating pipe is provided close to the inner bottom of the crucible; and the second purification unit comprises a casting mold, a furnace body, a heater, and a water-cooled plate, wherein the casting mold is positioned inside the furnace body, the heater is positioned outside the furnace body and the water-cooled plate is positioned at the bottom of the casting mold.

Further explanation will be given below in conjunction with specific examples.

Figure 2:
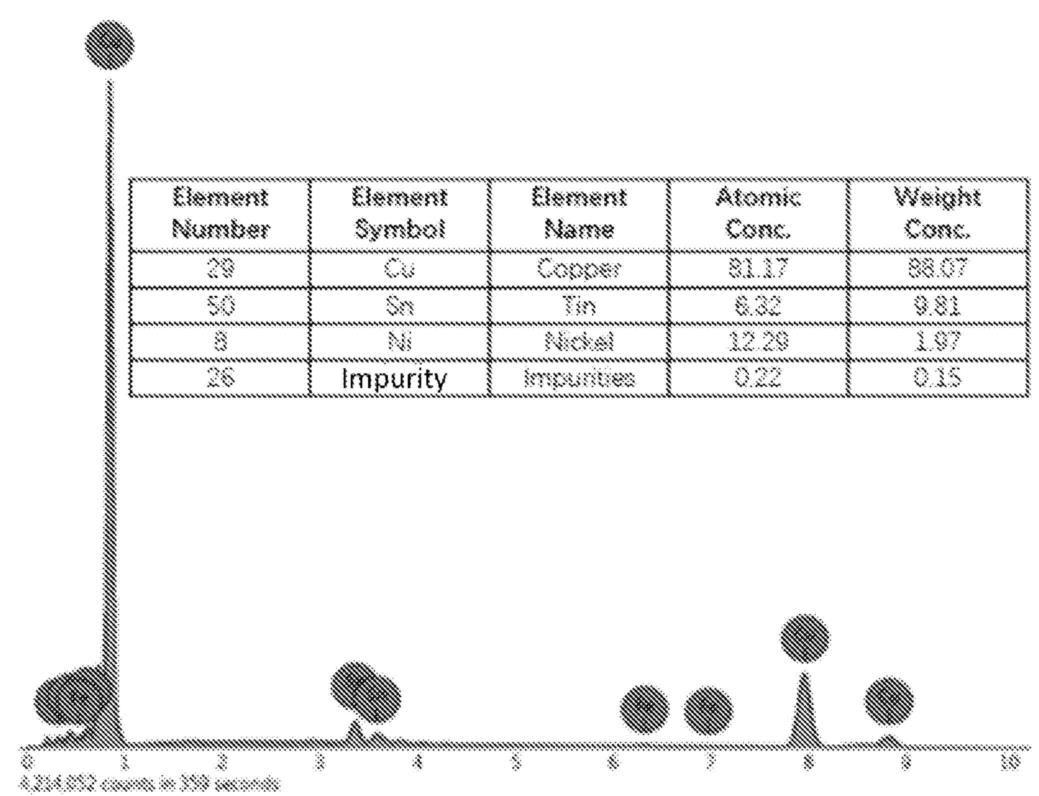
FIG. 2 shows the energy spectrum of the brazing powder remelting alloy in Example 1 of the present disclosure.
Figure 3:
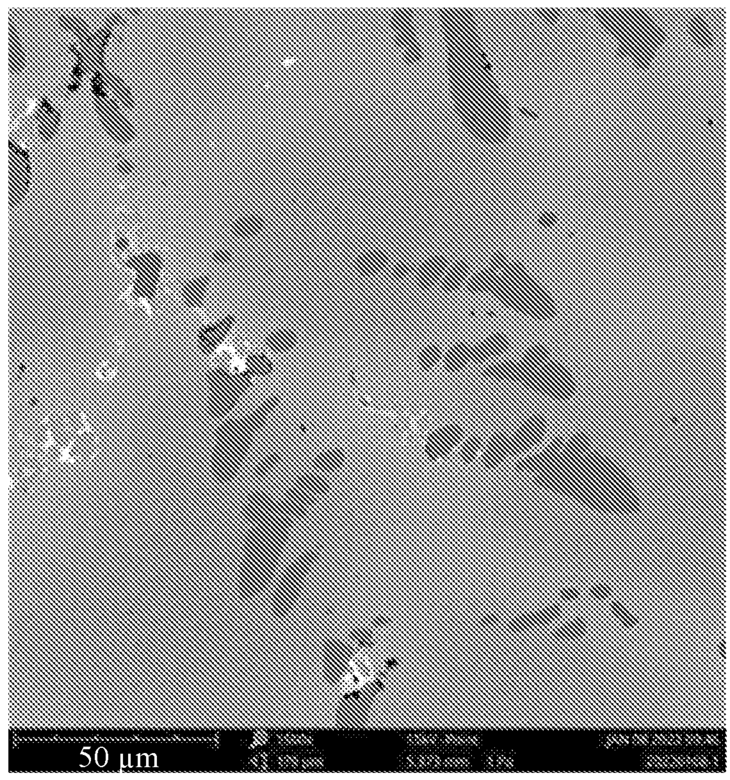
FIG. 3 shows the metallographic structure of the brazing powder in Example 1 of the present disclosure.
Figure 4:
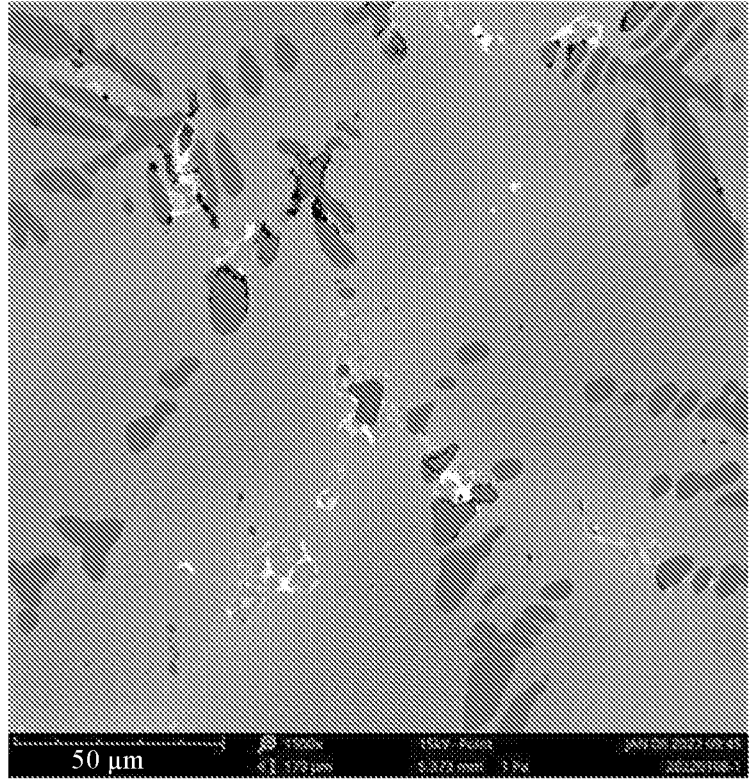
FIG. 4 shows the metallographic structure of commercially available BCu88Sn brazing powder.
Figure 5:
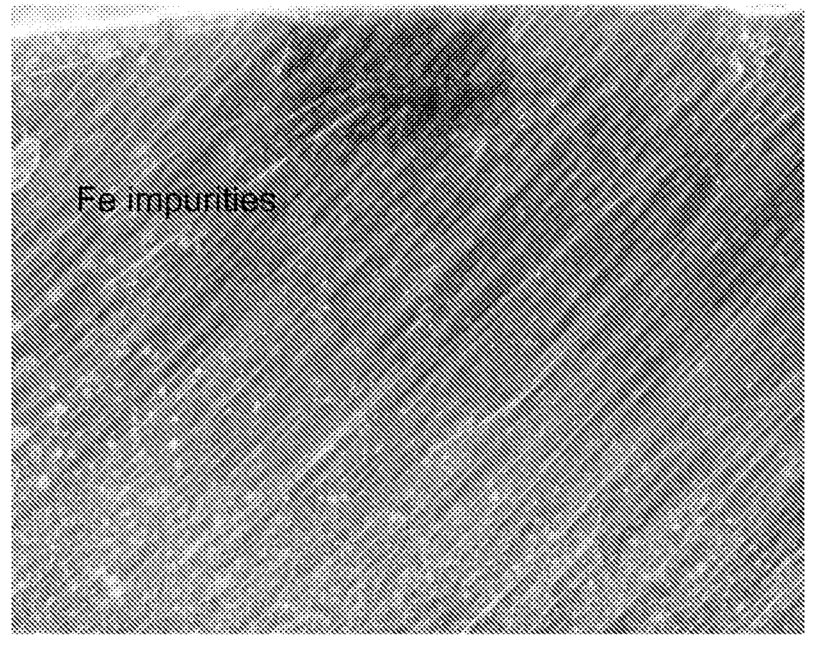
FIG. 5 shows the morphology (10 folds) of impurities bias-aggregated at one end after isothermal directional solidification of the present disclosure.

The SEM image of the brazing powder remelting alloy in Example 1 of the present disclosure is shown in FIG. 1. The energy spectrum of the brazing powder remelting alloy in Example 1 of the present disclosure is shown in FIG. 2. The metallographic structure of the brazing powder in Example 1 of the present disclosure is shown in FIG. 3. The metallographic structure of the commercially available BCu88Sn brazing powder is shown in FIG. 4. The morphology (10 folds) of impurity bias-aggregated at one end of the present disclosure after isothermal directional solidification is shown in FIG. 5.

Figure 6:
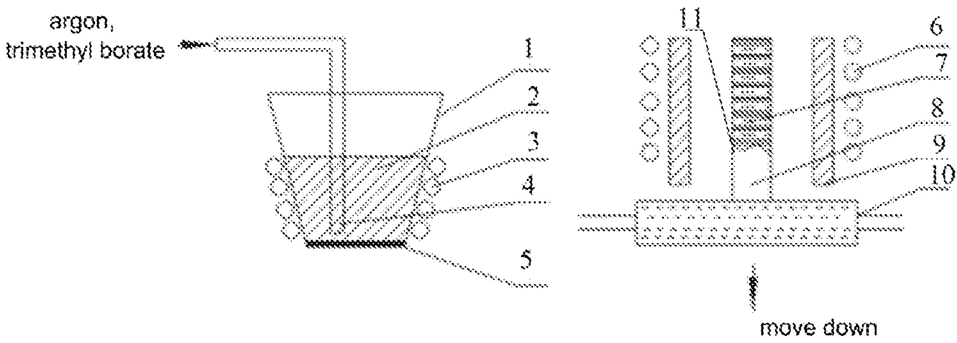
FIG. 6 is a schematic view of the preparation system of copper-tin-nickel brazing powder of the present disclosure.

In one embodiment, the system used for the preparation method for the copper-tin-nickel brazing material in each embodiment is shown in FIG. 6, including a first purification unit and a second purification unit.

The first purification unit includes a crucible 1, a sensor 3 and a ceramic pipe 4, wherein the sensor 3 is provided outside the crucible 1, and one end of the ceramic pipe 4 is close to the inner bottom of the crucible 1. The inner bottom of crucible 1 is covered by nano-SiO2 powder 5, the metal liquid 2 is provided inside the crucible 1, and the ceramic pipe 4 is used to introduce the mixed gas of N2 and trimethyl borate. The powder producing unit includes a casting mold 11, a furnace body 9, a heater 6, and a water-cooled plate 10, wherein the casting mold 11 is positioned inside the furnace body 9, the heater 6 is positioned outside the furnace body 9, and the water-cooled plate 10 is positioned in the bottom of the casting mold 11. In the process of powdering, the metal liquid inside the casting mold 11 that is close to the water-cooled plate 10 forms a solid metal 8 in the lower portion of the casting mold, and the upper portion is a metal liquid 7 in the upper portion of the casting mold.

Example 1

The preparation method of copper-tin-nickel brazing powder using copper-tin-iron-nickel alloy recycled from E-waste included the following steps:

(1) spreading an appropriate amount of nano-SiO2 powder on the bottom of the graphite crucible, and then placing the crude copper-tin-iron-nickel alloy recycled from E-waste (Cu accounted for 80%, Sn accounted for 9%, Ni accounted for 1.8%, and Fe, Zn, Pb, S, and O impurities accounted for about 9.2% in terms of mass percentage) on it, wherein the size of the SiO2 powder was 15 nm;

(2) turning on the sensing power supply to heat to 1200° C., so as to melt the recycled crude copper-tin-iron-nickel alloy into metal liquid, wherein impurities Zn and Pb in metal liquid reacted with the SiO2 at the bottom to form a slag that floated out, so as to realize the first step of purification;

(3) introducing refining gas to the bottom of the metal liquid in step (2) and stirring continuously, such that impurity elements such as Pb, Fe, S, O, and the like in the solution formed scums or gases to be removed, so as to realize the second step of purification, wherein the refining gas was a mixed gas of argon and trimethyl borate;

(4) performing heat-preserving directional solidification on the metal liquid of step (3), so as to make impurity Fe bias-aggregate at one end, and removing the impurities mechanically, so as to realize the third step of purification, and obtain a pure copper-based intermediate alloy, wherein the heat-preserving directional solidification comprised specifically the following steps: injecting the metal liquid in step (3) inside the vertical casting mold, placing the casting mold in the center of the heater at 1000° C., the lower portion of which was placed on the water-cooled plate, when all the metal in the casting mold was in liquid status, passing the cooling circulating water through the water-cooled plate, and at the same time, slowly moving out the casting mold at the speed of 3 mm/s from below, so as to maintain that the metal liquid inside the casting mold was solidified sequentially in a single direction from bottom to top; and (5) melting the intermediate alloy of step (4) into an alloy liquid, sprinkling the covering agent on its surface and after standing for 10 min, removing the slag, and performing atomization, so as to obtain the copper-tin-nickel brazing powder, wherein the brazing powder contained 88% of Cu, 10% of Sn, and 2% of Ni by mass percentage, the covering agent was borax and calcium fluoride, and the mass ratio of the borax to calcium fluoride was 8:1.

Example 2

The preparation method of copper-tin-nickel brazing powder using copper-tin-iron-nickel alloy recycled from E-waste included the following steps:

(1) spreading an appropriate amount of nano-SiO2 powder on the bottom of the graphite crucible, and then placing the crude copper-tin-iron-nickel alloy recycled from E-waste (Cu accounted for 74.5%, Sn accounted for 13.6%, Ni accounted for 2.7%, and Fe, Zn, Pb, S, and O impurities accounted for about 9.2% in terms of mass percentage) on it, wherein the size of the nano-SiO2 powder was 20 nm;

(2) turning on the sensing power supply to heat to 1250° C., so as to melt the recycled crude copper-tin-iron-nickel alloy into metal liquid, wherein impurities Zn and Pb in metal liquid reacted with the SiO2 at the bottom to form a slag that floated out, so as to realize the first step of purification;

(3) introducing refining gas to the bottom of the metal liquid in step (2) and stirring continuously, such that impurity elements such as Pb, Fe, S, O, and the like in the solution formed scums or gases to be removed, so as to realize the second step of purification, wherein the refining gas was a mixed gas of argon and trimethyl borate;

(4) performing heat-preserving directional solidification on the metal liquid of step (3), so as to make impurity Fe bias-aggregate at one end, and removing the impurities mechanically, so as to realize the third step of purification, and obtain a pure copper-based intermediate alloy, wherein the heat-preserving directional solidification comprised specifically the following steps: injecting the metal liquid in step (3) inside the vertical casting mold, placing the casting mold in the center of the heater at 1050° C., the lower portion of which was placed on the water-cooled plate, when all the metal in the casting mold was in liquid status, passing the cooling circulating water through the water-cooled plate, and at the same time, slowly moving out the casting mold at the speed of 5 mm/s from below, so as to maintain that the metal liquid inside the casting mold was solidified sequentially in a single direction from bottom to top; and (5) melting the intermediate alloy of step (4) into an alloy liquid, sprinkling the covering agent on its surface and after standing for 15 min, removing the slag, and performing atomization, so as to obtain the copper-tin-nickel brazing powder, wherein the brazing powder contained 82% of Cu, 15% of Sn, and 3% of Ni by mass percentage, the covering agent was borax and calcium fluoride, and the mass ratio of the borax to calcium fluoride was 8:2.

Example 3

The preparation method of copper-tin-nickel brazing powder using copper-tin-iron-nickel alloy recycled from E-waste included the following steps:

(1) spreading an appropriate amount of nano-SiO2 powder on the bottom of the graphite crucible, and then placing the crude copper-tin-iron-nickel alloy recycled from E-waste (Cu accounted for 85.5%, Sn accounted for 4.5%, Ni accounted for 0.9%, and Fe, Zn, Pb, S, and O impurities accounted for about 9.1% in terms of mass percentage) on it, wherein the size of the SiO2 powder was 30 nm;

(2) turning on the sensing power supply to heat to 1300° C., so as to melt the recycled crude copper-tin-iron-nickel alloy into metal liquid, wherein impurities Zn and Pb in metal liquid reacted with the SiO2 at the bottom to form a slag that floated out, so as to realize the first step of purification;

(3) introducing refining gas to the bottom of the metal liquid in step (2) and stirring continuously, such that impurity elements such as Pb, Fe, S, O, and the like in the solution formed scums or gases to be removed, so as to realize the second step of purification, wherein the refining gas was a mixed gas of argon and trimethyl borate;

(4) performing heat-preserving directional solidification on the metal liquid of step (3), so as to make impurity Fe bias-aggregate at one end, and removing the impurities mechanically, so as to realize the third step of purification, and obtain a pure copper-based intermediate alloy, wherein the heat-preserving directional solidification comprised specifically the following steps: injecting the metal liquid in step (3) inside the vertical casting mold, placing the casting mold in the center of the heater at 1100° C., the lower portion of which was placed on the water-cooled plate, when all the metal in the casting mold was in liquid status, passing the cooling circulating water through the water-cooled plate, and at the same time, slowly moving out the casting mold at the speed of 8 mm/s from below, so as to maintain that the metal liquid inside the casting mold was solidified sequentially in a single direction from bottom to top; and (5) melting the intermediate alloy of step (4) into an alloy liquid, sprinkling the covering agent on its surface and after standing for 20 min, removing the slag, and performing atomization, so as to obtain the copper-tin-nickel brazing powder, wherein the brazing powder contained 94% of Cu, 5% of Sn, and 1% of Ni by mass percentage, the covering agent was borax and calcium fluoride, and the mass ratio of the borax to calcium fluoride was 8:3.

Experimental Example

I. Determination of the Composition of Brazing Powder

At present, the copper-tin-nickel brazing powder is mainly used for brazing steel, copper, and its alloys. In order to examine the quality of the brazing powder obtained by the present disclosure, the commercially available brazing powder and the brazing powder of the embodiment were remelted into a metal block, and the impurity content of the brazing powder of the embodiment was tested by a combination of chemical titration analysis and electron microscope energy spectrum analysis, and compared with the commercially available copper-tin brazing powder. The results of the comparison are shown in Table 1.

TABLE 1

| Mass percentage content of components in copper-tin-nickel brazing powder (%) | | | | |
|---|---|---|---|---|
| Sample name | Cu | Sn | Ni | Total content of impurities such as Pb, Fe, O, etc. |
| Example 1 | 88.0 | 9.9 | 2 | 0.1 |
| Example 2 | 82.1 | 14.58 | 3.2 | 0.12 |
| Example 3 | 94 | 4.8 | 1.1 | 0.1 |
| Commercially available BCu88Sn | 88 | 11.0 | 0.89 | 0.11 |

As can be seen in Table 1 and FIG. 1 and FIG. 2, the impurity contents in the brazing powder of the present disclosure and the commercially available brazing powder are less than 0.15%, which meets the brazing performance requirements.

II. As can be seen from FIG. 3 and FIG. 4, the metallographic structure of the brazing powder of Example 1 is similar to that of commercially available brazing powders, wherein both consist of a Cu-based solid solution and a dendritic Cu—Sn phase.

III. Strength Testing of Brazed Joints

Brazing powders of Examples 1-3 and commercially available BCu88Sn brazing powder were used for vacuum brazing of cemented carbide and steel, and the brazed joint strength was tested according to the method of GB/T 11363-2008, and the shear strengths of the joint are shown in Table 2.

TABLE 2

| Shear strengths of brazed joints between cemented carbide and steel by brazing powder | | | |
|---|---|---|---|
| Sample name | Brazing temperature/° C. | Heat preservation time/min | Average shear strength of joint/MPa |
| Example 1 | 1000 | 15 | 200.5 |
| Example 2 | 950 | 15 | 198.4 |
| Example 3 | 1100 | 15 | 215.3 |
| Commercially available BCu88Sn | 1000 | 215 | 196.5 |

As can be seen from Table 2, the brazed joint strength of brazing powder of each Example of the present disclosure is higher than the joint strength of the commercially available BCu88Sn brazing powder, which is due to the higher content of Ni in the brazing powders of Examples, wherein Ni is a hard phase, and plays the role of dispersion strengthening, thereby increasing a certain extent of the joint strength.

A final note should be made is that the above embodiments are only used to illustrate the technical solutions of the present disclosure and are not intended to be a limitation thereof. Although the present disclosure is described in detail with reference to the foregoing embodiments, those of ordinary skill in the art should understand: it is still possible to modify the technical solutions recorded in the preceding embodiments, or to replace some or all of the technical features therein with equivalent ones, and these modifications or replacements do not take the essence of the corresponding technical solutions out of the scope of the technical solutions of the embodiments of the present disclosure.

What is claimed is:

1. A preparation method for a copper-tin-nickel brazing material using an alloy recycled from an E-waste, comprising following steps:

(a) spreading nano-SiO2 on a bottom of a crucible and then adding a crude copper-tin-iron-nickel alloy recycled from the E-waste;

(b) heating the crucible to melt the crude copper-tin-iron-nickel alloy into a metal liquid, so that a first impurity in the metal liquid reacts with the SiO2 at the bottom to form a slag that floats out and is removed, wherein the first impurity includes Zn and Pb;

(c) introducing a refining gas to a bottom of the metal liquid in step (b) and stirring a resultant, such that a second impurity in the metal liquid forms a scum or a gas and then is removed, wherein the second impurity includes Pb, Fe, S, and O;

(d) performing a heat-preserving directional solidification on the metal liquid in step (c), so as to bias-aggregate a third impurity at one end and remove the third impurity to obtain a copper-based intermediate alloy, wherein the third impurity includes Fe and Sb; and (e) smelting and powdering the copper-based intermediate alloy in step (d).

2. The preparation method for the copper-tin-nickel brazing material using the alloy recycled from the E-waste according to claim 1, wherein the nano-SiO2 has a particle size of 15-30 nm.

3. The preparation method for the copper-tin-nickel brazing material using the alloy recycled from the E-waste according to claim 1, wherein a heating temperature for heating the crucible is 1200-1300° C.

4. The preparation method for the copper-tin-nickel brazing material using the alloy recycled from the E-waste according to claim 1, wherein the refining gas is a mixed gas of argon and trimethyl borate.

5. The preparation method for the copper-tin-nickel brazing material using the alloy recycled from the E-waste according to claim 1, wherein the heat-preserving directional solidification specifically comprises following steps:

injecting the metal liquid in step (c) into an interior of a vertically placed casting mold, heating the casting mold with a heater, and placing a lower portion of the casting mold on a water-cooled plate; and when all of the metal liquid in the casting mold is in a liquid status, passing a cooling circulating water through the water-cooled plate, and at the same time, moving out the casting mold from below.

6. The preparation method for the copper-tin-nickel brazing material using the alloy recycled from the E-waste according to claim 5, wherein the smelting and the powdering specifically comprise: melting the copper-based intermediate alloy into an alloy liquid, sprinkling a covering agent on a surface of the alloy liquid, and then making a resultant undergo standing, slagging-off, and atomization.

7. The preparation method for the copper-tin-nickel brazing material using the alloy recycled from the E-waste according to claim 1, wherein the crude copper-tin-iron-nickel alloy recycled from the E-waste comprises components in following mass percentages:

74.5%-85.5% of Cu, 4.5%-13.6% of Sn, 0.9%-2.7% of Ni, and the remaining impurity elements; and the impurity elements comprise Fe, Zn, Pb, S, and O.

8. The preparation method for the copper-tin-nickel brazing material using the alloy recycled from the E-waste according to claim 4, wherein a volume ratio of argon to trimethyl borate is 1:(2-3).

9. The preparation method for the copper-tin-nickel brazing material using the alloy recycled from the E-waste according to claim 5, wherein a heating temperature to heat the casting mold is 1000-1100° C.

10. The preparation method for the copper-tin-nickel brazing material using the alloy recycled from the E-waste according to claim 5, wherein the casting mold is removed from below at a speed of 3-8 mm/s.

11. The preparation method for the copper-tin-nickel brazing material using the alloy recycled from the E-waste according to claim 6, wherein the covering agent comprises a borax and a calcium fluoride.

12. The preparation method for the copper-tin-nickel brazing material using the alloy recycled from the E-waste according to claim 11, wherein a mass ratio of the borax and the calcium fluoride is 8:(1-3).

13. The preparation method for the copper-tin-nickel brazing material using the alloy recycled from the E-waste according to claim 6, wherein a standing time is 10-20 min.

14. The preparation method for the copper-tin-nickel brazing material using the alloy recycled from the E-waste according to claim 7, wherein a mass percentage of the impurity elements is 9.1%-9.2%.

* * * * *